US010151559B2

(12) United States Patent
Higgins (10) Patent No.: US 10,151,559 B2
(45) Date of Patent: Dec. 11, 2018

(54) METHOD FOR SECURING TWO OR MORE PARTS

(71) Applicant: Stephen Mark Higgins, Carrollton, TX (US)

(72) Inventor: Stephen Mark Higgins, Carrollton, TX (US)

(*) Notice: Subject to any disclaimer, the term of this patent is extended or adjusted under 35 U.S.C. 154(b) by 15 days.

(21) Appl. No.: 14/957,200

(22) Filed: Dec. 2, 2015

(65) Prior Publication Data

US 2016/0153746 A1  Jun. 2, 2016

Related U.S. Application Data

(60) Provisional application No. 62/086,547, filed on Dec. 2, 2014.

(51) Int. Cl.

| F41C 33/02 | (2006.01) |
|---|---|
| B23P 15/00 | (2006.01) |
| B23P 13/00 | (2006.01) |
| A47C 21/00 | (2006.01) |
| F41A 23/18 | (2006.01) |
| F41C 33/04 | (2006.01) |
| F16B 21/08 | (2006.01) |
| B29C 65/56 | (2006.01) |

(52) U.S. Cl.
CPC .......... *F41C 33/0209* (2013.01); *A47C 21/00* (2013.01); *B23P 13/00* (2013.01); *B23P 15/00* (2013.01); *F41A 23/18* (2013.01); *F41C 33/041* (2013.01); *B29C 65/56* (2013.01); *F16B 21/084* (2013.01); *F16B 21/086* (2013.01); *Y10T 29/49861* (2015.01); *Y10T 29/49947* (2015.01)

(58) Field of Classification Search
CPC ........ F41C 33/02; F41C 33/041; F41A 23/18; A47C 21/00; F16B 5/0258; F16B 39/34; F16B 39/284; F16B 43/001; F16B 17/00; B23P 19/02; B23P 13/00; B29C 65/56; Y10T 29/49861; Y10T 29/49872
See application file for complete search history.

(56) References Cited

U.S. PATENT DOCUMENTS

| 4,258,460 | A | * | 3/1981 | Melnyk | ................. F16L 13/166 |
|---|---|---|---|---|---|
| | | | | | 228/183 |
| 4,483,501 | A | | 11/1984 | Eddy | |
| 5,461,777 | A | * | 10/1995 | Ikeda | ........................ F01N 1/24 |
| | | | | | 29/234 |
| 6,321,918 | B1 | | 11/2001 | Rollins | |
| 6,442,806 | B1 | * | 9/2002 | Wesson | ..................... F16B 2/06 |
| | | | | | 24/16 PB |
| 6,685,066 | B2 | | 2/2004 | Cragg | |
| 7,159,711 | B1 | | 1/2007 | Gardner | |
| 7,584,861 | B2 | | 9/2009 | Werner | |
| 8,770,116 | B2 | | 7/2014 | Heim et al. | |
| 9,481,268 | B2 | * | 11/2016 | Furuta | .................. B29C 66/612 |
| 2015/0300777 | A1 | | 10/2015 | Stalker | |

\* cited by examiner

*Primary Examiner* — Sarang Afzali
(74) *Attorney, Agent, or Firm* — Jack D. Stone, Jr., Esq.; Scheef & Stone, L.L.P.

(57) ABSTRACT

A hole is formed through the two or more parts, and a hollow tube is extended through the hole. A first plug is inserted into a first end of the tube, and a second end of the tube is pulled through the hole until the first plug is urged against the two or more parts. The second end of the tube is then cut so that the second end is flush with the two or more parts. A second plug is then inserted into the second end of the tub.

1 Claim, 8 Drawing Sheets

METHOD FOR SECURING TWO OR MORE PARTS

CROSS-REFERENCE TO RELATED APPLICATION

This application claims the benefit of U.S. Provisional Application No. 62/086,547, filed Dec. 2, 2014, which application is hereby incorporated herein by reference, in its entirety.

TECHNICAL FIELD

The present invention relates to a universal holster for securely holding a handgun and, more particularly, to a holster that can securely store a handgun along the side of a bed.

BACKGROUND

Home invasion is a frightening, but real possibility. Often home invasions occur at night when a homeowner(s) is asleep. For this reason, homeowners feel the need to keep means of defensive protection, such as a firearm, Taser, stun gun, or the like, near the place where they sleep. Occasionally, a handgun will be stored underneath a pillow or a mattress, in a nightstand, or some other place where the handgun can be quickly accessed. However, such places are not designed for storing a handgun. Such improvised storage locations are often unsafe. For example, a handgun stored in a drawer of a nightstand may become mixed in with other clutter in the drawer and, while looking for something at night, accidently discharge the handgun. The homeowner also may not be able to quickly retrieve the handgun in an emergency, especially when awoken suddenly in the middle of the night. For example, a handgun stored under the mattress requires lifting a heaving mattress and finding the handgun, which may have shifted around over time.

Further complicating matters is whether to keep the handgun loaded with ammunition. On one hand, because the homeowner may need the handgun at a moment's notice during a break-in, the homeowner will store the handgun loaded. On the other hand, due to the inherent safety risks associated with a loaded handgun, the handgun will be stored unloaded. In this case, the homeowner must then spend time searching for and loading ammunition when the handgun is needed, often in the dark.

Accordingly, what is needed is a safe and reliable apparatus for storing and retrieving a handgun proximate to where a homeowner(s) sleeps. It would be desirable if such an apparatus could also be used to safely and reliably transport the handgun.

SUMMARY OF THE INVENTION

The present invention, accordingly, provides a universal bedside holster assembly configured with a backing having a flap portion and hanging portion. The flap portion is preferably positionable under a mattress of a bed, and the backing is sufficiently conformable to allow the hanging portion to hang downwardly along the side of the bed. A cradle, adaptable to holding a handgun, is secured to the hanging portion of the backing. Optionally, the flap portion may be folded over the cradle to secure the handgun for transportation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

In the discussion of the FIGURES, the same reference numerals will be used throughout to refer to the same or similar components. In the interest of conciseness, various other components known to the art, such as pistols, mattresses, and the like, have not been shown or discussed in detail. Additionally, as used herein, the term "substantially" is to be construed as a term of approximation. The term handguns as used herein includes handguns, revolvers, Tasers, pistols, stun guns, and the like effective for protection.

Figure 1:
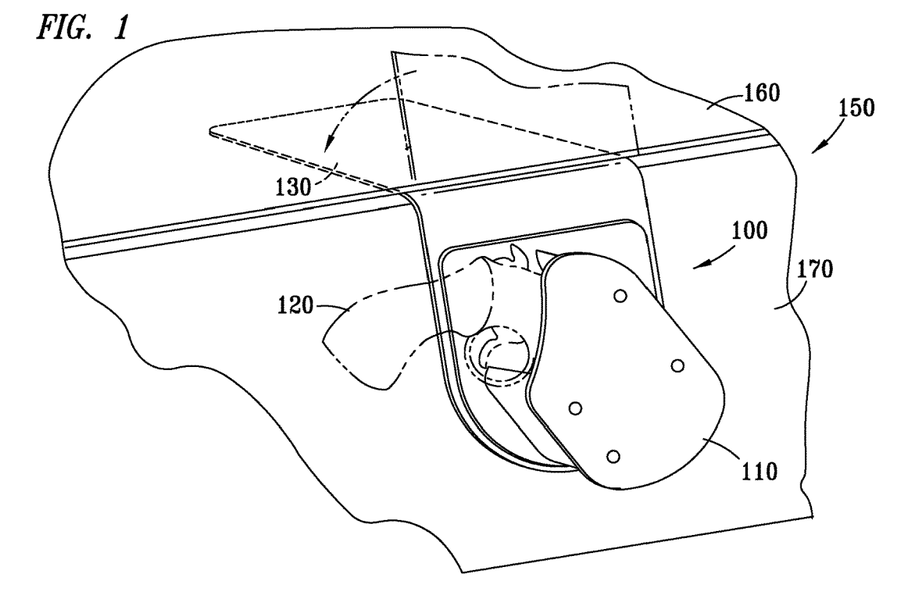
FIG. 1 is a perspective view exemplifying a holster assembly constructed according to one embodiment of the present invention, wherein the holster assembly is holding a handgun and is secured along the side of a bed.

Referring to FIG. 1 of the drawings, the reference numeral 100 generally designates a universal, bedside holster assembly embodying features of the present invention. Holster assembly 100 comprises a backing 210 (FIG. 3) having a flap portion 130 and a hanging portion 132. A cradle 110 is attached to the hanging portion 132. The assembly 100 is exemplified with a handgun 120, shown in dashed outline, secured in cradle 110. In one preferred embodiment, flap portion 130 is configured for securing holster assembly 100 to the side of a bed 150. The bed 150 is exemplified in FIGS. 1 and 2 as having a mattress 160, which sits on top of a box spring or bedframe 170. In order to secure holster assembly 100 to bed 150, flap 130 is inserted between mattress 160 and box spring 170 as shown most clearly in FIG. 2.

Figure 2:
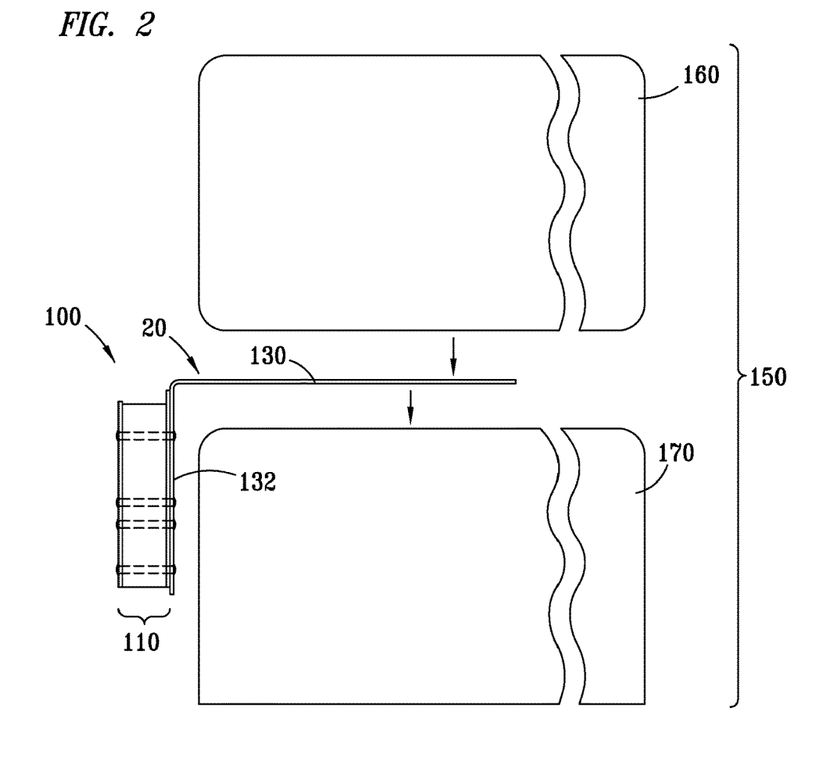
FIG. 2 is a side view of the holster assembly of FIG. 1 secured along a bedside.

Referring to FIG. 2, a side view of holster assembly 100 is illustrated secured along a bedside. When secured to the bedside, cradle 110 is vertically aligned. This allows a handgun to be secured in the cradle 110 generally from the top and held in place by gravity. Flap portion 130 of holster assembly 100 is bent at about a 90 degree angle. Flap portion 130 is inserted between mattress 160 and box spring or bedframe 170. The weight of the mattress 160 prevents holster assembly 100 from slipping out.

Figure 3:
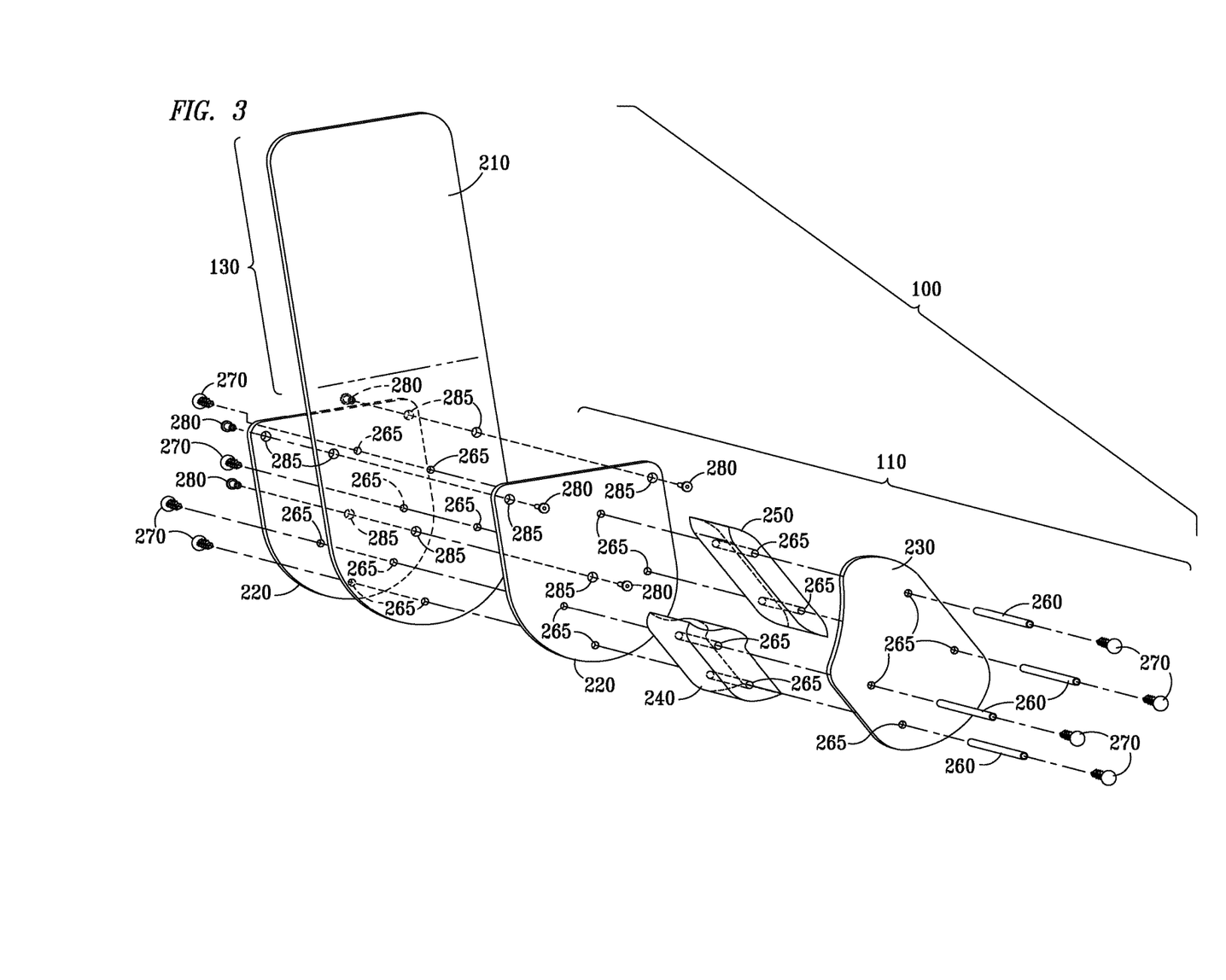
FIG. 3 is an exploded view of the holster assembly of FIG. 1.

Referring to FIG. 3 of the drawings, an exploded view of holster assembly 100 is depicted with backing 210. In one embodiment of the present invention, backing 210 is fabricated from a flexible material, such as rubber, neoprene, or the like, sufficiently flexible to fold over, yet effective for conforming to various surfaces, thus preventing the holster 100 from slipping out from between mattress 160 and box spring 170. The upper portion of backing 210 forms flap portion 130 and cradle 110 is formed on the hanging portion 132. In a preferred embodiment, a pair of stabilizing walls 220 are attached directly to each side of the hanging portion 132 of backing 210 using fasteners 280, which are inserted through openings 285. In this embodiment, fasteners 280 are preferably binder screws (also referred to as Chicago screws). In other embodiments, stabilizing walls are omitted or only a single stabilizing wall is used. A lower supporting pad 240 and a higher supporting pad 250 are secured between one stabilizing wall 220 and an outer wall 230. Supporting pads 240 and 250 are preferably fabricated from foam, preferably polyethylene, or any other suitable material. Four openings 265 are formed in walls 220 and 230, backing 210, and supporting pads 240 and 250. Walls 220 and 230 are preferably fabricated from a suitable material, such as a thin sheet of acrylonitrile butadiene styrene (ABS), thermoplastic, metal, leather, or the like. Four tubes 260 are inserted into openings 265. Each end of each tube 260 is preferably secured with plugs 270, which secures outer wall 230 and supporting pads 240 and 250 to backing 210 and stabilizing walls 220 and forms handgun compartment 290 (FIG. 5) into which handgun 120 may be secured. The tube-and-plug fasteners (260 and 270) are described in further detail below, with respect to FIG. 12. In other embodiments where stabilizing walls 220 are omitted, outer wall 230 and supporting pads 240 and 250 are secured directly to backing 210. It may be appreciated that a person skilled in the art could readily configure and shape the compartment 290 to accommodate various types and sizes of handguns.

Figures 4, 5:
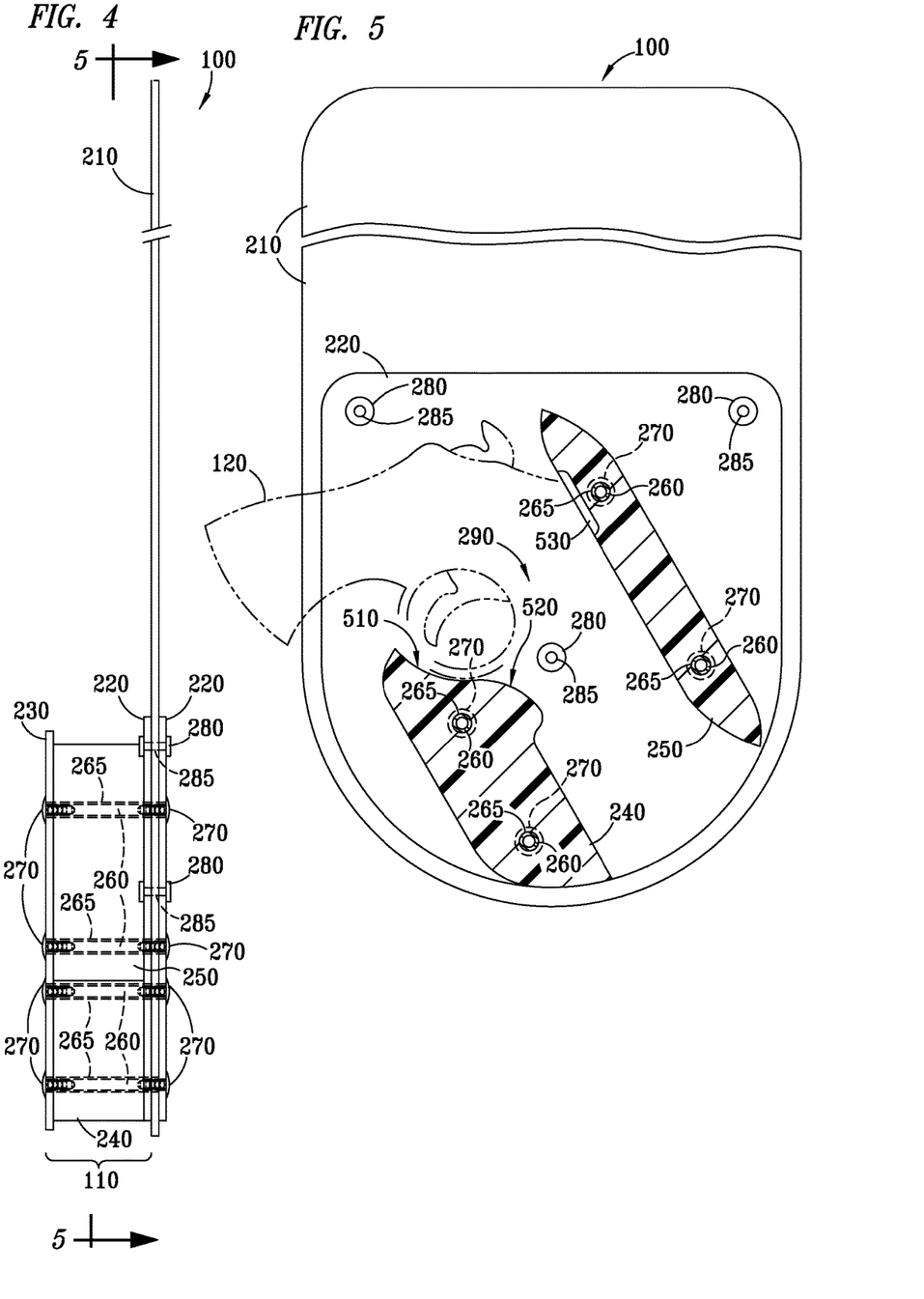
FIG. 4 is a side view of the holster assembly of FIG. 1.
FIG. 5 is a partial-cutaway, planar-top view of the holster assembly of FIG. 1, taken along line 5-5 of FIG. 4.

Referring to FIG. 4 of the drawings, illustrated is a side view of holster assembly 100 with flap 130 shown in a vertically extended position. As shown from left to right in FIG. 4, tubes 260 protrude through openings 265 in outer wall 230, supporting pads 240 and 250 (FIG. 5), interior stabilizing wall 220, backing 210, and exterior stabilizing wall 220. Each end of each tube 260 is fastened by plugs 270. The length of tubes 260 corresponds to the thickness of backing 210, supporting pads 240 and 250, and walls 220 and 230. The thickness of the supporting pads determines the thickness of handgun compartment 290 (FIG. 5). By way of example, but not limitation, walls 220 and 230 may be spaced apart by about one 1.5 inches (3.8 cm), which allows for the cradle 110 to accommodate most handguns.

Referring to FIG. 5 of the drawings, a partial-cutaway, planar-top view of holster assembly 100 taken along line 5-5 of FIG. 4 is illustrated with the flap 130 shown in a vertically extended position. Handgun compartment 290 is formed between outer wall 230 (FIGS. 3 and 4), supporting pads 240 and 250, and interior stabilizing wall 220. The assembly 100 is exemplified with a handgun 120, shown in dashed outline, secured in handgun compartment 290. In an alternative embodiment of the present invention, the top portion of lower supporting pad 240 has first and second trigger-guard rests 510 and 520, which align with the trigger guard of a handgun when inserted into handgun compartment 290. First trigger-guard rest 510 is configured for accommodating a larger handgun, while second trigger-guard rest 520 is configured for accommodating a smaller handgun. When a handgun is inserted into handgun compartment 290, upper supporting pad 250 is configured to secure the barrel edge of the handgun in place. Upper supporting pad 250 defines a slot 530 to prevent the sights of a handgun from damaging the supporting pad when the handgun is secured in handgun compartment 290. Fasteners 280 are inserted into openings 285 to secure stabilizing walls 220 to backing 210. Tubes 260 are inserted into openings 265 and plugs 270 secure each end of tubes 260, thus, securing the outer wall 230 (FIG. 4) and supporting pads 240 and 250 to backing 210 and stabilizing walls 220.

Figure 6:
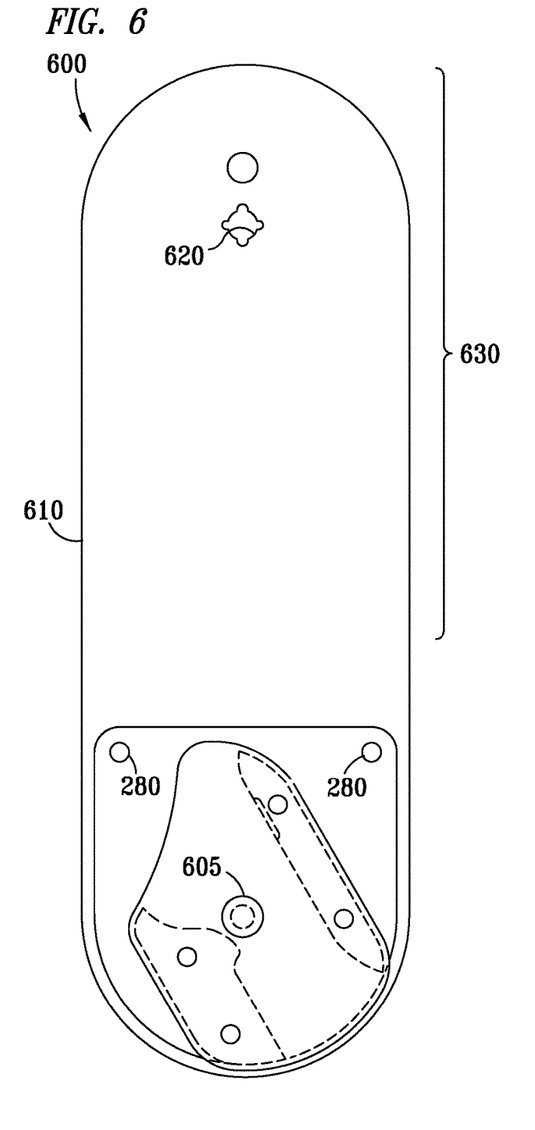
FIG. 6 is a planar-top view of an alternate embodiment of a holster assembly in accordance with the present invention.
Figure 7:
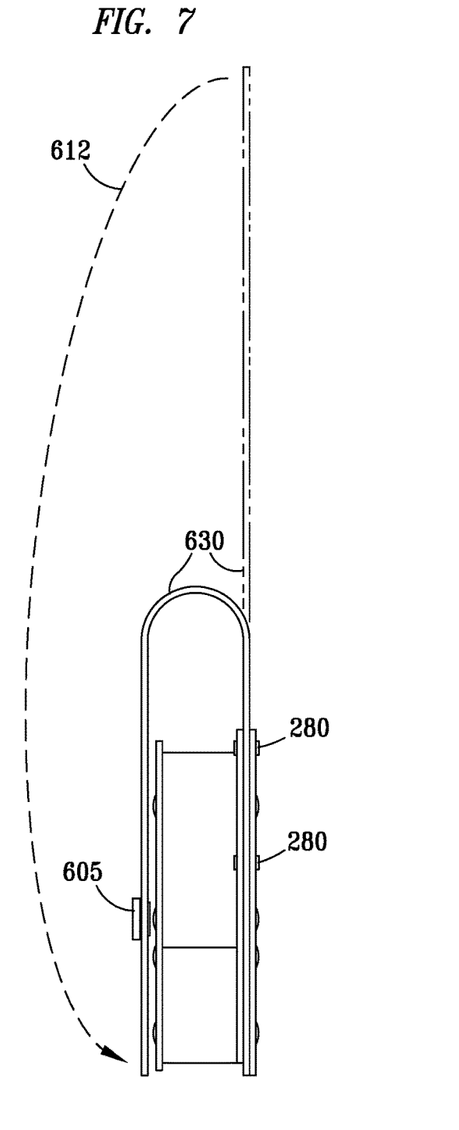
FIG. 7 is a side view of the holster assembly depicted in FIG. 6.

FIG. 6 depicts an alternate embodiment of the present invention, embodied in a holster assembly 600 similar to the holster assembly 100. The holster assembly 600 includes a backing 610 similar to the backing 210, with a flap portion 630 similar to the flap portion 130 but defines an opening 620 in the flap 630. The holster assembly 600 also includes a knob 610. FIG. 7 illustrates holster assembly 600 in a closed position with flap portion 630 folded over as indicated by the arrow 612. The closed position is secured through insertion of the knob 610 through opening 620. A handgun in holster assembly 600 may thus be secured and safely transported. In other embodiments, knob 610 and openings 620 can be replaced with other means for securing the flap, such as, a snap button, Velcro®, or magnets.

Figure 8:
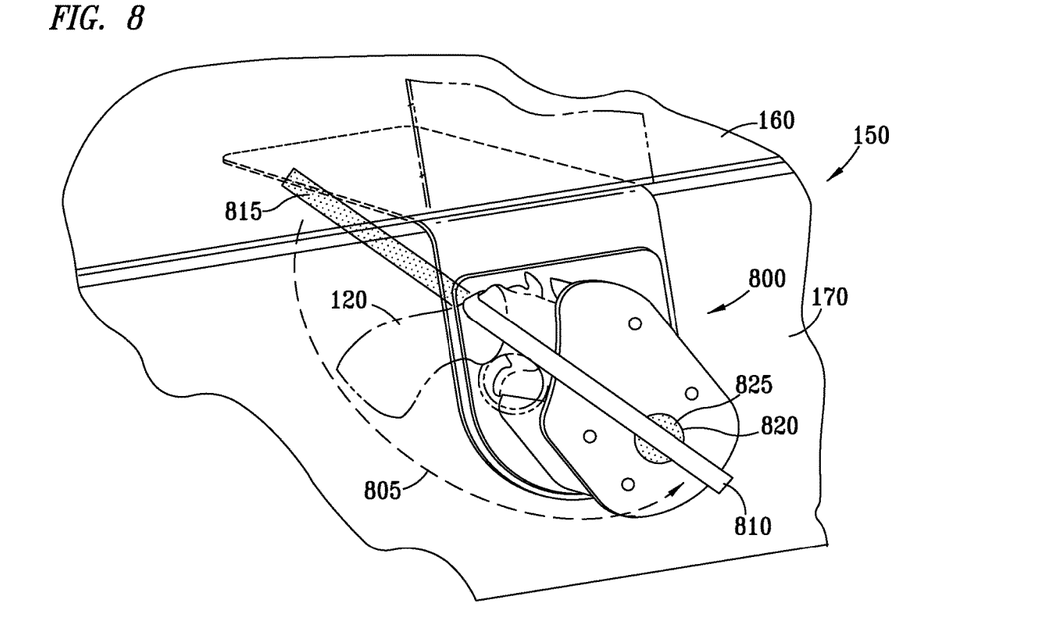
FIG. 8 is a perspective view of yet another alternate embodiment of a holster assembly.
Figures 9, 10:
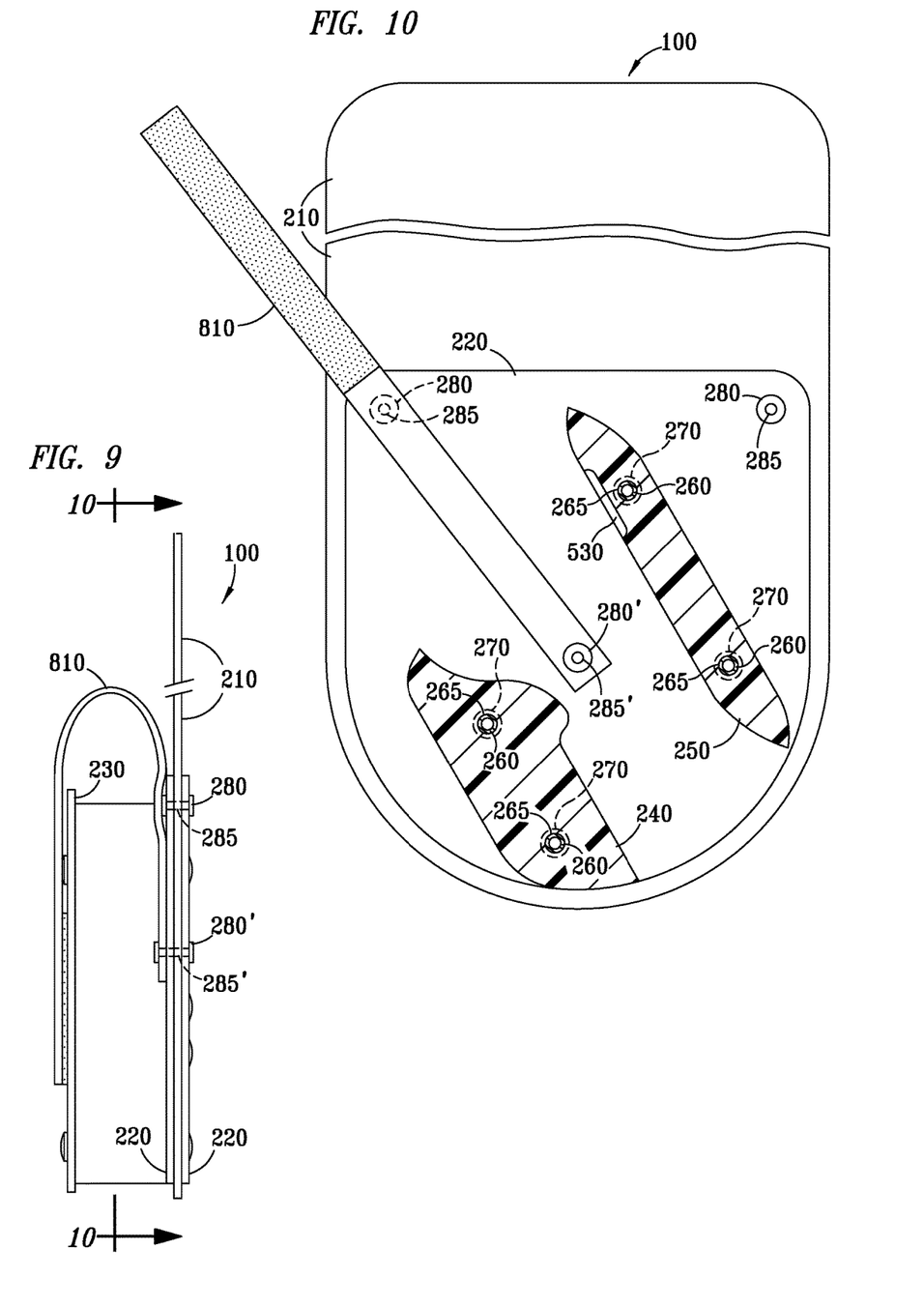
FIG. 9 is a side view of the holster assembly of FIG. 8.
FIG. 10 is a cross-sectional, planar-top view of the holster assembly of FIG. 8, taken along line 10-10 of FIG. 9.

FIGS. 8-10 depict another alternate embodiment of the present invention, embodied in a holster assembly 800, that includes a means for securing a handgun when a handgun is stored in the holster assembly. Accordingly, holster assembly 800 is similar to the holster assembly 100, but also includes a Velcro® strap 810 securing handgun 120, as depicted by an arrow 805 (FIG. 8). One side of Velcro® strap 810 has hooks 815 which engage loops 825 on receiver 820 (FIGS. 9 and 10). Strap 810 is secured to the holster assembly 800, preferably by using fastener 280' used to secure the interior stabilizing wall to the backing (FIG. 10). Holster assembly 800 is assembled similarly to the embodiments described above and shown in FIG. 3.

Figure 11:
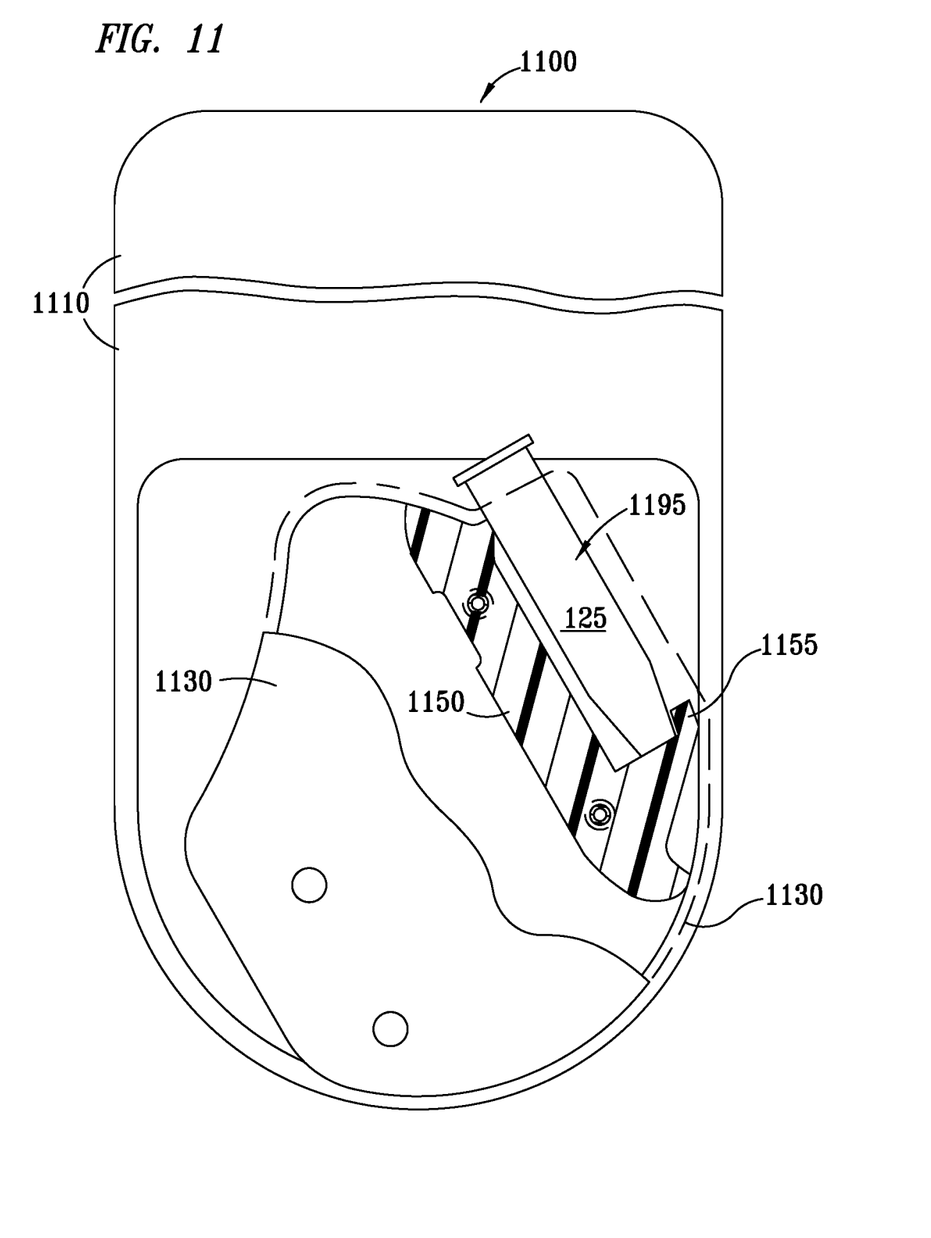
FIG. 11 is a partial-cutaway, planar-top view of an alternate embodiment of a holster assembly in accordance with the present invention.

FIG. 11 exemplifies a further alternative embodiment of the invention, embodied in a holster assembly 1100, in which a storage compartment 1195 is provided, which may be used to store a flashlight, additional ammunition, and/or the like. Holster assembly 1100 is substantially identical to the embodiments disclosed above, but for (1) a supporting pad 1150 having ledge 1155 which replaces supporting pad 250, and (2) an extended outer wall 1130 which replaces outer wall 230. Storage compartment 1195 is defined by supporting pad 1150 and ledge 1155, extended outer wall 1130, and stabilizing wall 220. Storage compartment 1195 may be used to store a flashlight, ammunition, and/or the like. Holster assembly 1100 is exemplified having ammunition magazine 125 stored in storage compartment 1195.

In the assembly of the holster assemblies described above, supporting pads 240, 250, and 1150 are preferably fabricated from a suitable sheet of foam, such as a polyethylene foam. The sheet of foam preferably has a thickness (such as 1.5 inches or 3.8 cm) suitable for forming a cradle 110 sized for receiving and holding a selected handgun. The sheet of foam is then suitably cut, preferably using a water jet cutter, to form respective supporting pads. Thus, each supporting pad is preferably fabricated from a single, unitary piece of foam.

The stabilizing walls 220 and outer walls 230 and 1130 are preferably cut from a sheet of tough plastic (e.g., acrylonitrile butadiene styrene, aka ABS) using a water jet cutter. The sheet of plastic preferably has a thickness, such as about 0.093 inches (0.236 cm), sufficient to provide desired vertical and transverse structural support, yet flexible enough to bend when a lateral force is applied. This allows for handguns of different widths to be stored in the handgun compartments, including handguns whose widths exceed the width of a given compartment. For example, a revolver having a cylinder wider than the handgun compartment can be accommodated as outer walls can flex. As such, handgun assembly has the benefit of accommodating virtually any sized handgun.

The backing 210 is fabricated from a flexible material, such as rubber, neoprene, or the like, having a suitable thickness (e.g., ⅛ inch) sufficient for providing desired strength, while being sufficiently flexible to fold over and to conform to surfaces. Backings are preferably cut using a water jet cutter.

The stabilizing walls 220 are secured to the lower portion of the backing 210 using fasteners, such as plastic binder screws (also referred to as Chicago screws).

Figures 12, 12A:
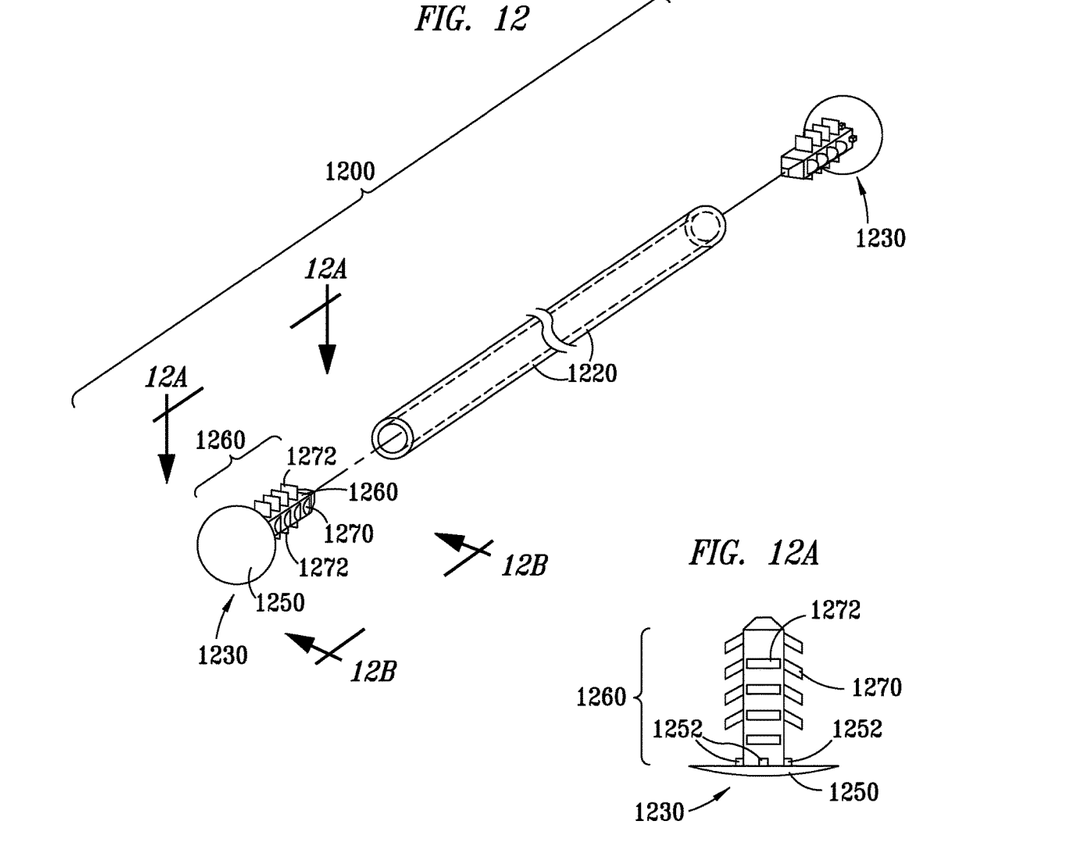
FIG. 12 is a perspective view of an embodiment of a tube and plug fastener in accordance with the present invention.
FIG. 12A is a side view of a plug in accordance with a preferred embodiment of the present invention taken along view line 12A-12A of FIG. 12.
Figure 12B:
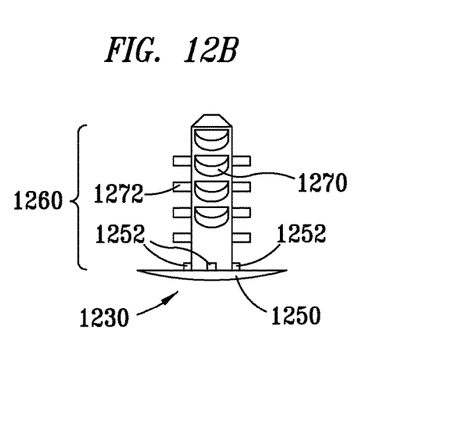
FIG. 12B is a side view of the plug taken along view line 12B-12B of FIG. 12.

With reference to FIGS. 12, 12A, and 12B, the outer walls 230 and 1130 and the supporting pads 240, 250, and 1150 are preferably secured to the backing 210 and stabilizing walls 220 using fasteners such as tube and plug fasteners 1200. Fastener 1200 comprises tube 1220 and pair of plugs 1230. In a preferred embodiment, tube 1220 (260 in FIG. 3) is fabricated from plastic, such as polyethylene, with an outside diameter of approximately 0.25 inches (0.6 cm). The length of tube 1220 is determined by the width of the components being secured as discussed herein. Plugs 1230 are used to secure the ends of tube 1220. Each plug 1230 has a head 1250 and preferably a rectangular body 1260. Strengthening pillars 1252 are provided where head 1250 couples to body 1260. Strengthening pillars 1252 are advantageous as they strengthen the structural integrity of plug 1230, while conserving material used to fabricate plug 1230 and providing for a tighter fit between plug 1230 and an outer wall being secured. The body 1260 has angled ribbing 1270 and straight ribbing 1272 configured for allowing insertion of the body 1260 into the end of tube 1220, but for resisting removal of the body from the tube. Plugs 1230 are preferably injection molded from plastic, such as polypropylene.

Figure 12C:
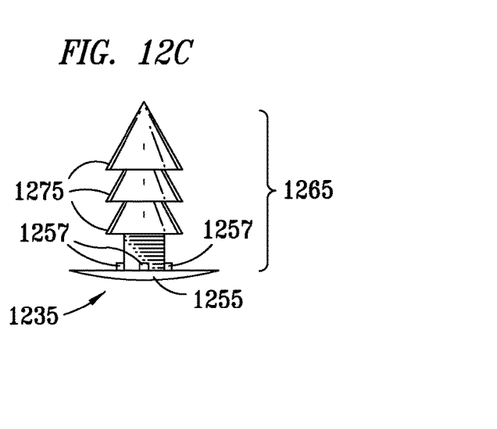
FIG. 12C is a side view of a plug in accordance with an alternate embodiment of the present invention.

Referring to FIG. 12C, plug 1235 is provided in accordance with an alternate embodiment of the present invention. Plugs 1235 may be used to secure the ends of tubes 1220 (see FIG. 12). Each plug 1235 has a head 1255 and a body 1265. Strengthening pillars 1257 are provided where head 1255 couples to body 1265. Strengthening pillars 1257 are advantageous as they strengthen the structural integrity of plug 1235, while conserving material used to fabricate plug 1235 and providing for a tighter fit between plug 1235 and an outer wall 230 or 1130 being secured. Body 1265 has conical ribbing 1275 configured for allowing insertion of the body 1265 into the end of tube 1220, but for resisting removal of the body from the tube. Plugs 1235 are preferably injection molded from plastic, such as polypropylene.

Openings 265 (FIG. 3) are formed in the walls 220, 230, and 1130 and the supporting pads 240, 250, and 1150. The openings 265 are preferably formed using a water jet cutter. In a preferred embodiment, openings are preferably approximately 0.25 inches (0.6 cm) in diameter. A tube 1220 is inserted preferably through the openings 265 in the stabilizing walls 220, supporting pads 240, 250, and 1150, and outer walls 230 and 1130. After securing one end of the tube 1220 using a plug (or other means for securing the opening) 1230 (270 in FIG. 3) (or alternatively 1235), the components of the holster assembly 100, 600, 800, or 1100 are positioned in their proper place along the tube 1220. Tubes 1220 are not pre-cut to precisely the needed length. Instead, the tubes are initially cut to a length slightly longer than the width of the finished holster assembly. As such, the unplugged end of the tube 1220 protrudes out from the opening in the outer wall 230 and 1130. The excess portion of the tube 1220 is then removed using a tool, e.g., a razor blade. A plug 1230 is then inserted into the end of the tube 1220. When the plug 1230 is inserted into the end of a tube 1220, the end of the tube is enlarged. This enlargement urges the tube 1220 against the opening 265 in the outer wall, which provides additional friction to secure the holster assembly together. Furthermore, because the length of the tube is precisely the width of the holster assembly, the head of the cap urges against the exterior surface of the outer wall, thereby providing additional structural stability.

The method of securing the holster assembly 100, 600, 800, or 1100 in accordance with principles of the invention provides a number of advantages not seen in the prior art. For example, it is particularly useful because the width of each component (e.g., the foam supporting pads) may vary by as much as ⅛ of an inch, which causes the width of the entire holster assembly to vary. If the tubes 1220 were precisely cut, some tubes would be too long or too short. Cutting the tubes 1220 after inserting them into the holster assembly ensures that each tube will be precisely the correct length for that particular holster assembly. This allows components (e.g., the foam supporting pads) to be cut using less expensive and less precise techniques, thus reducing manufacturing costs.

In the operation of the holster assembly 100, a user inserts the flap portion 130 of the backing 210 preferably between box springs 170 and a mattress 160 the user intends to sleep on. The hanging portion 132 then hangs downwardly. A handgun may then be inserted in the handgun compartment 290. If the handgun is needed, it may then be readily retrieved for use. In the embodiment 600 of FIGS. 6 and 7, the flap portion 630 may be folded over the handgun thereby protecting the handgun and preparing it for transport. In the embodiment 800, the handgun 120 may be secured in place by way of the strap 810. In the embodiment 1100, a user may also store items, such as a flashlight, additional ammunition, and/or the like in the storage compartment 1195.

The use of plastics and foam provides further advantages of a strong, yet lightweight, holster assembly 100, 600, 800, or 1100. In particular, lightweight foam is preferably used for larger components, such as the supporting pads 240, 250, and 1150. Stronger plastic is used for the walls 220, 230, and 1130 and fasteners 260, 270, 280, and 1200, which provide rigidity in all three dimensions and prevents the foam 240, 250, and 1150 from being crushed. Moreover, in a preferred embodiment, the present invention does not require any metal components, which are not only more costly but can also scratch or damage a handgun. Still further, the holster assembly also avoids the use of adhesives, which can deteriorate over time and potentially damage a handgun.

It is understood that the present invention may take many forms and embodiments. Accordingly, several variations may be made in the foregoing without departing from the spirit or the scope of the invention. For example, a mirror image of the invention depicted herein may be made so that the holster assembly may be used on either side of a bed. The flap may be replaced with one or more hooks that latch onto a bedframe rail, or with one or more straps that wrap around a bedframe rail.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of the preferred embodiments. Accordingly, it is appropriate that the appended claims be construed broadly and in a manner consistent with the scope of the invention.

The invention claimed is:

1. A method for securing two or more parts together, the method comprising steps of:
   forming two or more concentrically aligned holes through the two or more parts;
   extending a hollow tube through the two or more holes, the tube having a first end and a second end;
   inserting a first plug into the first end of the tube, wherein the first plug defines ribs configured for making direct contact with an interior surface of the hollow tube upon insertion into the first end of the tube, and for resisting removal from the first end of the tube;
   pulling the second end of the tube through the two or more holes until the first plug is urged against a first outermost surface of the two or more parts and the two or more parts are urged against each other;
   cutting the second end of the tube so that the second end is flush with a second outermost surface of the two or more parts urged against each other, wherein the second outermost surface of the two or more parts is opposite the first outermost surface of the two or more parts; and
   inserting a second plug into the second end of the tube, wherein the second plug defines ribs configured for making direct contact with the interior surface of the hollow tube upon insertion into the second end of the tube, and for resisting removal from the second end of the tube.

\* \* \* \* \*